US011722071B2

(12) United States Patent
Fu et al.

(10) Patent No.: US 11,722,071 B2
(45) Date of Patent: Aug. 8, 2023

(54) CONTROL CIRCUIT OF NPC-TYPE THREE-LEVEL CONVERTER, NPC-TYPE THREE-LEVEL CONVERTER AND WIND POWER GENERATOR SET

(71) Applicant: BEIJING GOLDWIND SCIENCE & CREATION WINDPOWER EQUIPMENT CO., LTD., Beijing (CN)

(72) Inventors: Songge Fu, Beijing (CN); Meng Wang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/905,166

(22) PCT Filed: Sep. 10, 2020

(86) PCT No.: PCT/CN2020/114490
§ 371 (c)(1),
(2) Date: Aug. 26, 2022

(87) PCT Pub. No.: WO2021/169244
PCT Pub. Date: Sep. 2, 2021

(65) Prior Publication Data
US 2023/0142038 A1    May 11, 2023

(30) Foreign Application Priority Data
Feb. 28, 2020  (CN) .......................... 202010129575.9

(51) Int. Cl.
*H02M 1/38* (2007.01)
*H02M 7/487* (2007.01)
(Continued)

(52) U.S. Cl.
CPC ........... *H02M 7/487* (2013.01); *H02M 1/084* (2013.01); *H02M 1/38* (2013.01); *H02M 7/53871* (2013.01)

(58) Field of Classification Search
CPC ........ H02M 7/487; H02M 1/084; H02M 1/38; H02M 7/53871
See application file for complete search history.

(56) References Cited

U.S. PATENT DOCUMENTS

| | | |
|---|---|---|
| 2004/0104701 A1 | 6/2004 | Ohshima |
| 2006/0197491 A1* | 9/2006 | Nojima ................. H02M 7/487 318/801 |

(Continued)

FOREIGN PATENT DOCUMENTS

| | | |
|---|---|---|
| CN | 1585251 A | 2/2005 |
| CN | 103051227 A | 4/2013 |

(Continued)

OTHER PUBLICATIONS

Extended European Search Report in related European Application No. EP 20921640.7 dated Jun. 9, 2023 (8 pages).

*Primary Examiner* — Gary L Laxton
(74) *Attorney, Agent, or Firm* — Bayes PLLC

(57) ABSTRACT

A control circuit for an NPC-type three-level converter is provided. Each phase bridge arm of the NPC-type three-level converter includes multiple IGBT devices. For each phase bridge arm, a control circuit corresponding to the phase bridge arm includes an off-time control circuit and a timing control circuit. The off-time control circuit is configured to reserve a preset time period for turn-off of the multiple IGBT devices in the corresponding phase bridge arm. The timing control circuit includes a first sub-circuit and a second sub-circuit, and each sub-circuit of the first sub-circuit and the second sub-circuit includes: a first fixed delay circuit, a second fixed delay circuit, a first AND gate (Continued)

circuit and a first OR gate circuit. For each sub-circuit, output terminals of the first AND gate circuit and the first OR gate circuit serve as output terminals of the timing control circuit, respectively.

20 Claims, 6 Drawing Sheets

(51) Int. Cl.
*H02M 1/084* (2006.01)
*H02M 7/5387* (2007.01)

(56) References Cited

U.S. PATENT DOCUMENTS

2013/0155551 A1* 6/2013 Grbovic ............... H02H 7/1216
361/18
2018/0159519 A1 6/2018 Chen et al.

FOREIGN PATENT DOCUMENTS

| CN | 104022672 A | 9/2014 |
| CN | 205160364 U | 4/2016 |
| CN | 106533228 A | 3/2017 |
| EP | 3331142 A1 | 6/2018 |
| JP | 08308246 A | 11/1996 |
| KR | 20040052356 A | 6/2004 |

* cited by examiner

CONTROL CIRCUIT OF NPC-TYPE THREE-LEVEL CONVERTER, NPC-TYPE THREE-LEVEL CONVERTER AND WIND POWER GENERATOR SET

CROSS-REFERENCE TO RELATED APPLICATIONS

This application is a national stage of International Application No. PCT/CN2020/114490, filed on Sep. 10, 2020, which claims priority to Chinese Patent Application No. 202010129575.9, filed on Feb. 28, 2020. The entire contents of each of the above-identified applications are expressly incorporated herein by reference.

TECHNICAL FIELD

The present disclosure generally relates to the technical field of converters, and more particularly, to a control circuit for an NPC-type three-level converter, an NPC-type three-level converter, and a wind turbine.

BACKGROUND

Since the NPC (Neutral Point Clamp) type three-level topology can use an insulated gate bipolar transistor IGBT (Insulated Gate Bipolar Transistor) device with a low blocking voltage to improve a DC bus voltage, thereby increasing an AC output voltage and expanding a system power level, the NPC-type three-level topology has been widely used in wind power converters.

FIG. 1 shows a schematic diagram of an NPC-type three-level circuit topology, in which, on the DC side, two sets of DC capacitors C1 and C2 are connected in series to form three potentials of DC+, NP and DC−; four IGBT devices T1, T2, T3 and T4, as well as their freewheeling diodes, are connected in series between DC+ potential and DC− potential, and the midpoint of the IGBT devices connected in series, namely point AC between T2 and T3 in FIG. 1, is an AC output terminal; the NP potential is connected to a point (i.e., point A in FIG. 1) between T1 and T2 through a diode D5, and connected a point (i.e., point B in FIG. 1) between T3 and T4 through a diode D6. When T2 is turned on, the potential at point A is clamped to the NP potential through the D5; when T3 is turned on, the potential at point B is clamped to the NP potential through the D6. Thus, the NPC-type topology is also called a diode clamping topology.

The NPC-type topology has strict PWM logic timing requirements. For example, when the AC output terminal is clamped to the DC− potential by other phase bridge arm, T1 and T2 share a DC total bus voltage from the DC+ potential to the DC− potential. In this case, if T1 is turned on earlier than T2, the potential at point A will be clamped to the DC+ potential, and T2 will bear the total bus voltage, resulting in the failure of T2, since generally the blocking voltage of T2 is slightly higher than the DC half bus voltage but less than the DC total bus voltage. If T1 and T2 are turned on simultaneously, due to the uncertainty of the voltage distribution at the turn-on time, T2 may also have a possibility of failure since D2 may bear a voltage beyond the blocking capacity. If T2 is turned on earlier than T1, then the potential at point A will be forcibly clamped to the NP potential by D5, and T1 only needs to bear the DC half bus voltage from the DC+ potential to the NP potential. Correspondingly, in the turn-off process, if T2 is turned off earlier than T1, T2 will fail due to bearing the DC total bus voltage. If T2 and T1 are turned off simultaneously, due to the uncertainty of the voltage distribution, T2 may also have a possibility of failure since D2 may bear a voltage beyond the blocking capacity. If T1 is turned off earlier than T2, the potential at point A will be forcibly clamped to the NP potential by D5, and T2 only needs to bear the DC half bus voltage from the NP potential to the DC− potential. The on-off timing requirements of T3 and T4 are the same as those of T1 and T2, and at any time, including normal PWM pulse control, abnormal PWM waveform, and shutdown time for fault protection, the above on-off timing requirements need to be complied, otherwise it will cause damage to the IGBT devices and affect the entire circuit.

In the conventional technology, software is usually used to avoid wrong timing of PWM pulses for controlling IGBT devices, so that the on-off timing of the IGBT devices can comply with the above on-off timing requirements. However, on the one hand, the reliability of the software cannot be ensured, and on the other hand, the use of software will also waste system resources. For example, it is necessary to determine by software whether the pulse is correct or not at each pulse cycle, which will waste a lot of time on judgment and comparison and time in executing the software.

SUMMARY

A control circuit for an NPC-type three-level converter, an NPC-type three-level converter, and a wind turbine are provided in exemplary embodiments of the present disclosure, to solve the problems such as low reliability and waste of system resources of the existing software method for PWM pulses for controlling IGBT devices.

According to an exemplary embodiment of the present disclosure, a control circuit for an NPC-type three-level converter is provided. Each phase bridge arm of the NPC-type three-level converter includes multiple IGBT devices. For each phase bridge arm, a control circuit corresponding to the phase bridge arm includes an off-time control circuit and a timing control circuit. The off-time control circuit is configured to reserve a preset time period for turn-off of multiple IGBT devices of a corresponding phase bridge arm. An input terminal of the off-time control circuit is configured to receive a PWM signal for controlling the multiple IGBT devices.

The timing control circuit includes a first sub-circuit and a second sub-circuit. Each of the first sub-circuit and the second sub-circuit includes: a first fixed delay circuit, a second fixed delay circuit, a first AND gate circuit, and a first OR circuit. In each sub-circuit, a first input terminal of the first AND gate circuit is connected to one of output terminals of the off-time control circuit via the first fixed delay circuit, and a second input terminal of the first AND gate circuit is connected to one of the output terminals of the off-time control circuit, an output terminal of the first AND gate circuit is connected to a first input terminal of the first OR gate circuit via the second fixed delay circuit, and a second input terminal of the first OR gate circuit is connected to one of output terminals of the off-time control circuit. Output terminals of the timing control circuit are respectively connected to gate terminals of the multiple IGBT devices. The output terminal of the first AND gate circuit and an output terminal of the first OR gate circuit in each sub-circuit serve as the output terminals of the timing control circuit, respectively.

According to another exemplary embodiment of the present disclosure, an NPC-type three-level converter is provided. The NPC-type three-level converter includes M phase bridge arms and M control circuits as described above. The M phase bridge arms are in one-to-one correspondence with the M control circuits. For each phase bridge arm, the control circuit corresponding to the phase bridge arm is used to control on and off of IGBT devices in the phase bridge arm. M is a quantity of AC phases.

According to yet another exemplary embodiment of the present disclosure, a wind turbine is provided. The wind turbine includes the NPC-type three-level converter as described above.

According to the control circuit for the NPC-type three-level converter, the NPC-type three-level converter, and the wind turbine provided in the exemplary embodiments of the present disclosure, it is possible to realize an effective and reliable control of on-off logic and timing of the IGBTs in the phase bridge arm through a hardware circuit with high reliability, to protect the entire loop of the NPC-type three-level converter system without wasting system resources.

Additional aspects and/or advantages of the present disclosure will be set forth in part in the description that follows, and in part will be apparent from the description, or may be learned by implementation of the present disclosure.

BRIEF DESCRIPTION OF DRAWINGS

The above and other objects and features of exemplary embodiments of the present disclosure will become clearer from the following description taken in conjunction with the accompanying drawings that exemplarily illustrate embodiments, in which.

DETAILED DESCRIPTION

Figure 1:
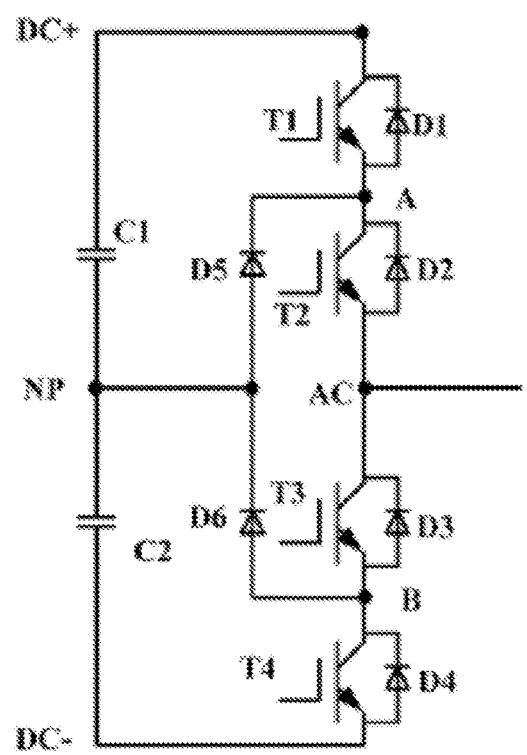
FIG. 1 shows a schematic diagram of an NPC-type three-level circuit topology.

Reference will now be made in detail to embodiments of the present disclosure, examples of which are illustrated in the accompanying drawings. A same reference numeral always refers to a same part. The embodiments are described below in conjunction with the figures, in order to explain the present disclosure.

Figure 2:
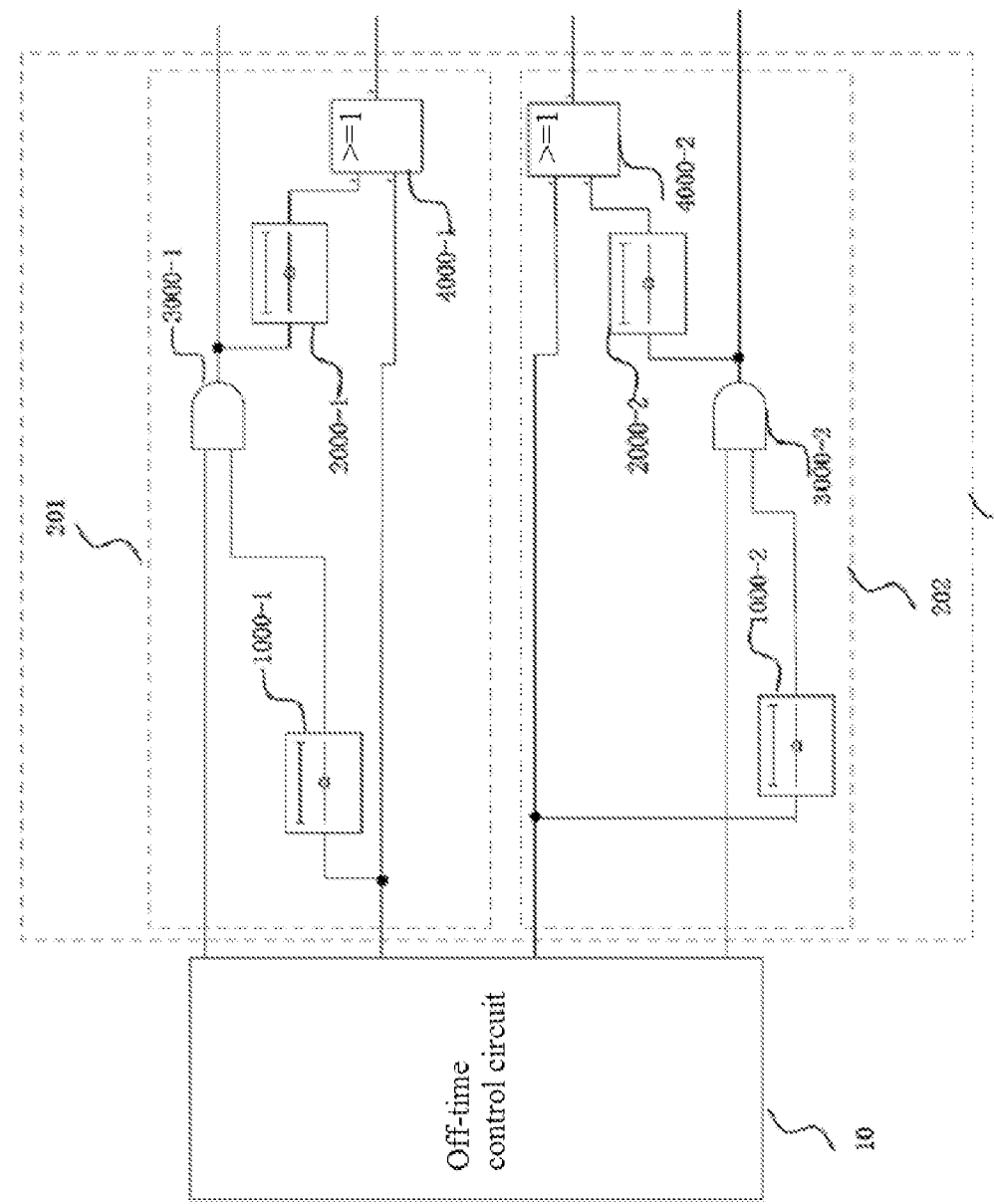
FIG. 2 shows a schematic diagram of a control circuit for an NPC-type three-level converter according to an exemplary embodiment of the present disclosure.

FIG. 2 shows a schematic diagram of a control circuit for an NPC-type three-level converter according to an exemplary embodiment of the present disclosure. Here, each phase bridge arm of the NPC-type three-level converter includes multiple IGBT devices.

As an example, the NPC-type three-level converter may include M phase bridge arms, where M is a quantity of AC phases corresponding to the NPC-type three-level converter. The M phase bridge arms have a one-to-one correspondence with respective AC phases (for example, A-phase, B-phase and C-phase of the three-phase alternating current).

As an example, the NPC-type three-level converter may be a wind power converter.

Each control circuit is used to control an on-off logic and timing of all IGBT devices in a corresponding phase bridge arm. Specifically, the control circuits have a one-to-one correspondence with the phase bridge arms. Each control circuit receives, from a host computer, a PWM signal for controlling the IGBT devices, processes the received PWM signal and outputs the processed PWM signal to gate terminals of multiple IGBT devices in the corresponding phase bridge arm, so as to control the on-off logic and timing of the IGBT devices in the corresponding phase bridge arm and avoid failure of the loop.

As shown in FIG. 2, for each phase bridge arm, the control circuit corresponding to the phase bridge arm includes an off-time control circuit 10 and a timing control circuit 20.

Specifically, the turn-off time control circuit 10 is used to reserve a preset time period for turn-off of multiple IGBT devices of a corresponding phase bridge arm. An input terminal of the off-time control circuit 10 receives a PWM signal for controlling the multiple IGBT devices, and an output terminal of the off-time control circuit 10 outputs the processed PWM signal to the timing control circuit 20. In the present disclosure, it is considered that the turn-off of an IGBT device has a transient process, that is, the IGBT device needs a certain period of time to enter the complete turn-off state from the turn-on state. Thus, the off-time control circuit 10 is provided to avoid the possible influence of the turn-off time of the IGBT devices on the on-off timing, thereby ensuring the synchronization of the control layer and the execution layer.

As an example, the off-time control circuit 10 may receive, from the host computer, a PWM signal for controlling all of the multiple IGBT devices, or may only receive a PWM signal for controlling part of the multiple IGBT devices, and generate a PWM signal for controlling another part of the multiple IGBT devices based on the received PWM signal.

The timing control circuit 20 is configured to process the PWM signal received from the off-time control circuit 10, and output the processed PWM signal to the gate terminals of the multiple IGBT devices. The processed PWM signal can control on-off timing of the multiple IGBT devices to meet certain requirements.

The timing control circuit 20 includes a first sub-circuit 201 and a second sub-circuit 202. Each of the first sub-circuit 201 and the second sub-circuit 202 includes: a first fixed delay circuit 1000, a second fixed delay circuit 2000, a first AND gate circuit 3000, and a first OR gate circuit 4000. That is, the first sub-circuit 201 includes: a first fixed delay circuit 1000-1, a second fixed delay circuit 2000-1, a first AND gate circuit 3000-1, and a first OR gate circuit 4000-1; the second sub-circuit 202 includes: a first fixed delay circuit 1000-2, a second fixed delay circuit 2000-2, a first AND gate circuit 3000-2, and a first OR gate circuit 4000-2.

Specifically, for each sub-circuit, a first input terminal of the first AND gate circuit 3000 is connected to one of output terminals of the off-time control circuit 10 via the first fixed delay circuit 1000, and a second input terminal of the first AND gate circuit 3000 is connected to one of the output terminals of the off-time control circuit 10, an output terminal of the first AND gate circuit 3000 is connected to a first input terminal of the first OR gate circuit 4000 via the second fixed delay circuit 2000, and a second input terminal of the first OR gate circuit 4000 is connected to one of the output terminals of the off-time control circuit 10.

Output terminals of the timing control circuit 20 are respectively connected to the gate terminals of the multiple IGBT devices. For each of the first sub-circuit 201 and the second sub-circuit 202, the output terminal of the first AND gate circuit 3000 and an output terminal of the first OR gate circuit 4000 serve as the output terminals of the timing control circuit 20, respectively.

Figure 3:
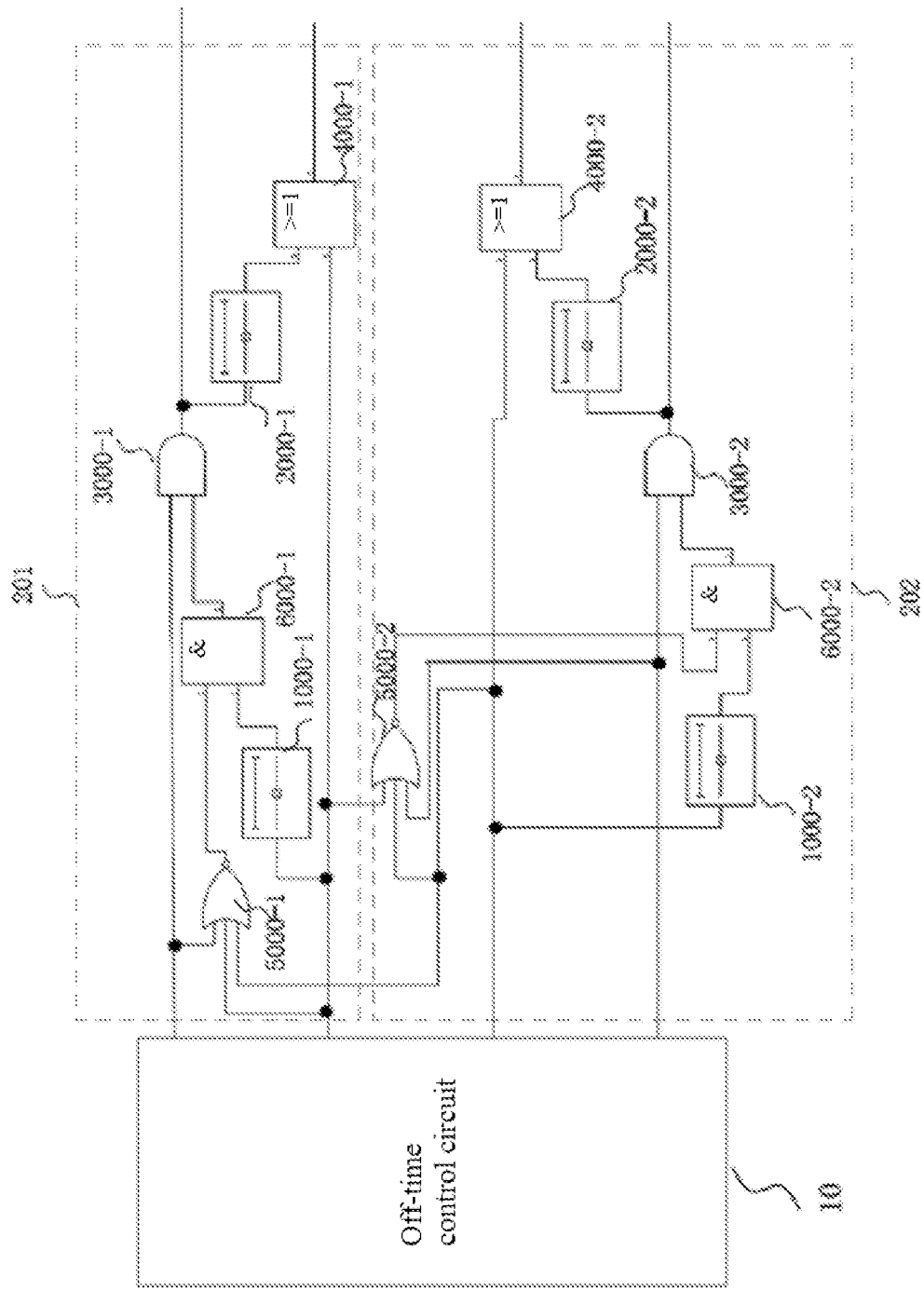
FIG. 3 shows a schematic diagram of a control circuit for an NPC-type three-level converter according to another exemplary embodiment of the present disclosure.

FIG. 3 shows a schematic diagram of a control circuit for an NPC-type three-level converter according to another exemplary embodiment of the present disclosure.

As shown in FIG. 3, each of the first sub-circuit 201 and the second sub-circuit 202 may further include: a NAND gate circuit 5000 and a second AND gate circuit 6000. That is, the first sub-circuit 201 further includes: a NAND gate circuit 5000-1 and a second AND gate circuit 6000-1; the second sub-circuit 202 further includes: a NAND gate circuit 5000-2 and a second AND gate circuit 6000-2.

Specifically, in each sub-circuit, three input terminals of the NAND gate circuit 5000 are respectively connected to the three output terminals of the off-time control circuit 10, and an input terminal of the first fixed delay circuit 1000 is connected to one of the output terminals of the off-time control circuit 10, an output terminal of the NAND gate circuit 5000 and an output terminal of the first fixed delay circuit 1000 are respectively connected to two input terminals of the second AND gate circuit 6000, and an output terminal of the second AND gate circuit 6000 is connected to one of the input terminals of the first AND gate circuit 3000. According to the exemplary embodiment of the present disclosure, the NAND gate circuit 5000 and the second AND gate circuit 6000 are provided in the timing control circuit 20, which effectively avoids a short circuit formed on the bridge arm.

Figure 4:
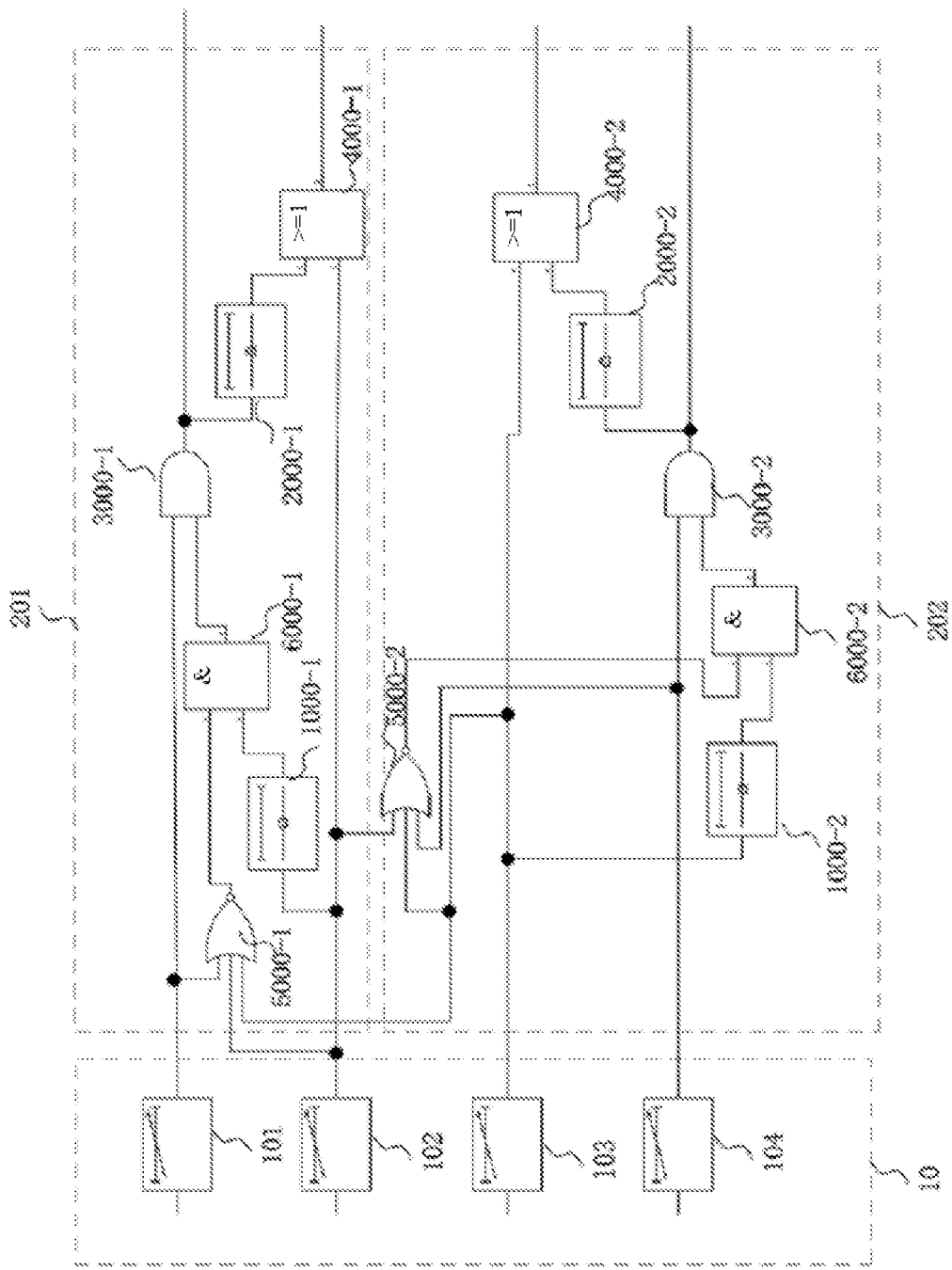
FIG. 4 shows a schematic diagram of a control circuit for an NPC-type three-level converter according to another exemplary embodiment of the present disclosure.

FIG. 4 shows a schematic diagram of a control circuit for an NPC-type three-level converter according to another exemplary embodiment of the present disclosure.

As shown in FIG. 4, the off-time control circuit 10 may include: a first rising edge delay circuit 101, a second rising edge delay circuit 102, a third rising edge delay circuit 103, and a fourth rising edge delay circuit 104. Output terminals of the first rising edge delay circuit 101, the second rising edge delay circuit 102, the third rising edge delay circuit 103 and the fourth rising edge delay circuit 104 serve as output terminals of the off-time control circuit 10.

Specifically, the output terminals of the first rising edge delay circuit 101, the second rising edge delay circuit 102 and the third rising edge delay circuit 103 are respectively connected to three input terminals of the NAND gate circuit 5000-1 in the first sub-circuit 201. The output terminal of the first rising edge delay circuit 101 is also connected to one of input terminals of the first AND gate circuit 3000-1 in the first sub-circuit 201. The output terminal of the second rising edge delay circuit 102 is also connected to the input terminal of the first fixed delay circuit 1000-1 in the first sub-circuit 201 and one of input terminals of the first OR gate circuit 4000-1 in the first sub-circuit 201.

The output terminals of the second rising edge delay circuit 102, the third rising edge delay circuit 103 and the fourth rising edge delay circuit 104 are respectively connected to three input terminals of the NAND gate circuit 5000-2 in the second sub-circuit 202. The output terminal of the fourth rising edge delay circuit 104 is also connected to one of input terminals of the first AND gate circuit 3000-2 in the second sub-circuit 202. The output terminal of the third rising edge delay circuit 103 is also connected to the input terminal of the first fixed delay circuit 1000-2 in the second sub-circuit 202 and one of input terminals of the first OR gate circuit 4000-2 in the second sub-circuit 202.

As an example, each phase bridge arm may include N bridge arms each with a same structure. Each bridge arm includes a first IGBT device, a second IGBT device, a third IGBT device, and a fourth IGBT device (e.g., T1, T2, T3 and T4 shown in FIG. 1). For each bridge arm, the DC positive pole of the bridge arm is connected to the negative pole of the bridge arm sequentially through the first IGBT device, the second IGBT device, the third IGBT device and the fourth IGBT device included in the bridge arm. N is an integer greater than 0.

Further, as an example, the PWM signal received by the input terminal of the first rising edge delay circuit 101 is used to control the first IGBT device, and the PWM signal received by the input terminal of the second rising edge delay circuit 102 is used to control the second IGBT device, the PWM signal received by the input terminal of the third rising edge delay circuit 103 is used to control the third IGBT device, and the PWM signal received by the input terminal of the fourth rising edge delay circuit 104 is used to control the fourth IGBT device. The output terminal of the first AND gate circuit 3000-1 in the sub-circuit 201 is connected to gate terminals of N first IGBT devices of the corresponding phase bridge arm. The output terminal of the first OR gate circuit 4000-1 in the first sub-circuit 201 is connected to gate terminals of N second IGBT devices of the corresponding phase bridge arm. The output terminal of the first OR gate circuit 4000-2 in the second sub-circuit 202 is connected to gate terminals of N third IGBT devices of the corresponding phase bridge arm. The output terminal of the first AND gate circuit 3000-2 in the second sub-circuit 202 is connected to gate terminals of N fourth IGBT devices of the corresponding phase bridge arm.

In other words, the gate terminals of the first IGBT devices of respective bridge arms in the corresponding phase bridge arm are all connected to a first output terminal of the timing control circuit 20; the gate terminals of the second IGBT devices of respective bridge arms in the corresponding phase bridge arm are all connected to a second output terminal of the timing control circuit 20; the gate terminals of the third IGBT devices of respective bridge arms in the corresponding phase bridge arm are connected to a third output terminal of the timing control circuit 20; the gate terminals of the four IGBT devices of respective bridge arms in the corresponding phase bridge arm are all connected to a fourth output terminal of the timing control circuit 20.

As an example, the input terminals of the first rising edge delay circuit 101, the second rising edge delay circuit 102, the third rising edge delay circuit 103 and the fourth rising edge delay circuit 104 may directly serve as input terminals of the off-time control circuit 10 and may respectively receive PWM signals for controlling the corresponding IGBT devices from the host computer.

Figure 5:
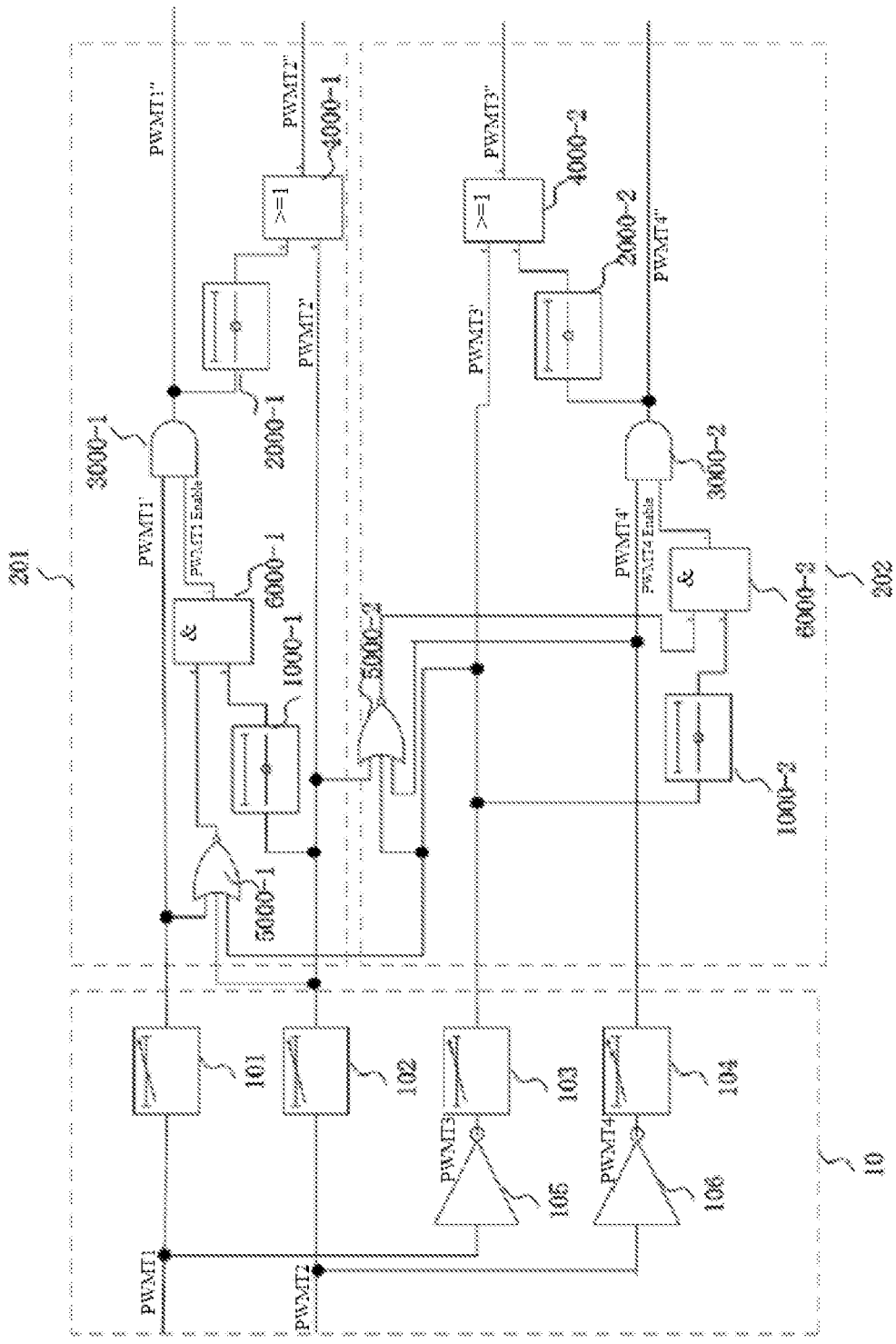
FIG. 5 shows a schematic diagram of a control circuit for an NPC-type three-level converter according to another exemplary embodiment of the present disclosure.

FIG. 5 shows a schematic diagram of a control circuit for an NPC-type three-level converter according to another exemplary embodiment of the present disclosure.

As shown in FIG. 5, the off-time control circuit 10 may further include: a first inverter 105 and a second inverter 106. An input terminal of the first rising edge delay circuit 101 and an input terminal of the first inverter 105 are connected together, to serve as a first input terminal of the off-time control circuit 10 and receive the PWM signal for controlling the first IGBT devices from the host computer, that is, the PWMT1 signal shown in FIG. 5. An input terminal of the second rising edge delay circuit 102 and an input terminal of the second inverter 106 are connected together, to serve as a second input terminal of the off-time control circuit 10 and receive the PWM signal for controlling the second IGBT devices from the host computer, that is, the PWMT2 signal shown in FIG. 5. An output terminal of the first inverter 105 is connected to the input terminal of the third rising edge delay circuit 103, an output terminal of the second inverter 106 is connected to the input terminal of the fourth rising edge delay circuit 104.

Referring to FIG. 5, the PWMT1 signal and the PWMT2 signal may be generated by the host computer MCU. The first rising edge delay circuit 101 and the first inverter 105 receive the PWMT1 signal, the second rising edge delay circuit 102 and the second inverter 106 receive the PWMT2 signal, the third rising edge delay circuit 103 receives the PWMT3 signal outputted from the first inverter 105, and the fourth rising edge delay circuit 104 receives the PWMT4 signal outputted from the second inverter 106.

As an example, the delay time of the first rising edge delay circuit 101, that is the first preset time period reserved for the turn-off of the first IGBT device, may be set based on a dead time of the third IGBT device. The delay time of the second rising edge delay circuit 102, that is the second preset time period reserved for the turn-off of the second IGBT device, may be set based on a dead time of the fourth IGBT device. The delay time of the third rising edge delay circuit 103, that is the third preset time period reserved for the turn-off of the third IGBT device, may be set based on a dead time of the first IGBT device. The delay time of the fourth rising edge delay circuit 104, that is the fourth preset time period reserved for the turn-off of the fourth IGBT device, may be set based on a dead time of the second IGBT device.

For example, the dead time of an IGBT device may be equal to twice the turn-off delay time of the IGBT device minus the turn-on delay time (i.e., Tdead=2*(Tdoff−Tdon)), and the dead time may generally be determined based on an actual test result of the IGBT. For example, the delay time of each of the rising edge delay circuits may be set to 2 us. It should be understood that the delay time of different rising edge delay circuits may be the same or different.

The NAND gate circuit 5000-1 receives the PWMT1' signal outputted by the first rising edge delay circuit 101, the PWMT2' signal outputted by the second rising edge delay circuit 102, and the PWMT3' signal outputted by the third rising edge delay circuit 103. The first fixed delay circuit 1000-1 receives the PWMT2' signal outputted by the second rising edge delay circuit 102. The second AND gate circuit 6000-1 receives signals outputted by the NAND gate circuit 5000-1 and the first fixed delay circuit 1000-1. The first AND gate circuit 3000-1 receives an enable signal (i.e., the PWMT1 Enable) outputted by the second AND gate circuit 6000-1 and the PWMT1' signal outputted by the first rising edge delay circuit 101, and outputs the PWMT1" signal to gate terminals of all the first IGBT devices of the corresponding phase bridge arm.

The NAND gate circuit 5000-2 receives the PWMT2' signal outputted by the second rising edge delay circuit 102, the PWMT3' signal outputted by the third rising edge delay circuit 103, and the PWMT4' signal outputted by the fourth rising edge delay circuit 104. The first fixed delay circuit 1000-2 receives the PWMT3' signal outputted by the third rising edge delay circuit 103. The second AND gate circuit 6000-2 receives signals outputted by the NAND gate circuit 5000-2 and the first fixed delay circuit 1000-2. The first AND gate circuit 3000-2 receives an enable signal (i.e., the PWMT4 Enable) outputted by the second AND gate circuit 6000-2 and the PWMT4' signal outputted by the fourth rising edge delay circuit 104, and outputs the PWMT4" signal to gate terminals of all the fourth IGBT devices of the corresponding phase bridge arm.

The second fixed delay circuit 2000-1 receives the PWMT1" signal outputted by the first AND gate circuit 3000-1. The first OR gate circuit 4000-1 receives the signal outputted by the second fixed delay circuit 2000-1 and the PWMT2' signal outputted by the second rising edge delay circuit 102, and outputs the PWMT2" signal to gate terminals of all the second IGBT devices of the corresponding phase bridge arm.

The second fixed delay circuit 2000-2 receives the PWMT4" signal outputted by the first AND gate circuit 3000-2. The first OR gate circuit 4000-2 receives the signal outputted by the second fixed delay circuit 2000-2 and the PWMT3' signal outputted by the third rising edge delay circuit 103, and outputs the PWMT3" signal to gate terminals of all the third IGBT devices of the corresponding phase bridge arm.

As an example, the fixed delay time of the first fixed delay circuit 2000-1, the first fixed delay circuit 2000-2, the second fixed delay circuit 2000-1 and the second fixed delay circuit 2000-2 may be set as needed. For example, the delay time may be set to 500 ns, and it should be understood that the delay times of different fixed delay circuits may be the same or different.

Referring to FIG. 5, PWMT3 and PWMT1 are opposite in phase due to the first inverter 105, and PWMT4 and PWMT2 are opposite to in phase due to the second inverter 106. That is, signal interlocking can be achieved through the first inverter 105 and the second inverter 106.

According to an exemplary embodiment of the present disclosure, the first rising edge delay circuit 101 and the second rising edge delay circuit 102 can ensure that the rising edges of the PWMT1 signal and the PWMT2 signal are delayed by a set delay time (for example, 2 us), such that the rising edges of the PWMT1 signal and the PWMT2 can have a time difference of 2 us with the falling edges of the PWMT3 signal and the PWMT4 signal. Thus, the third IGBT device and the fourth IGBT device can be reliably turned off due to this time difference, so as to avoid an impact of the transient process when the IGBT device is turned off on the on-off timing.

According to an exemplary embodiment of the present disclosure, the third rising edge delay circuit 103 and the fourth rising edge delay circuit 104 can ensure that the rising edges of the PWMT3 signal and the PWMT4 signal are delayed by a set delay time (for example, 2 us), such that the rising edges of the PWMT3 signal and the PWMT4 can have a time difference of 2 us with the falling edges of the PWMT1 signal and the PWMT2 signal. Thus, the first IGBT device and the second IGBT device can be reliably turned off due to this time difference, so as to avoid an impact of the transient process when the IGBT device is turned off on the on-off timing.

If the gate signals of the first IGBT device, the second IGBT device and the third IGBT device are all at a high level at a same time, a short circuit from DC+ to NP will be formed in the bridge arm, resulting in a short circuit. According to an exemplary embodiment of the present disclosure, when the PWMT1' signal, the PWMT2' signal and the PWMT3' signal are all at the high level at a same time, the NAND gate 5000-1 will output a low level signal, so that the enable signal PWMT1 Enable outputted by the second AND gate circuit 6000-1 is 0, thereby forcibly turning off the first IGBT device and avoiding a short circuit.

If the gate signals of the second IGBT device, the third IGBT device and the fourth IGBT device are all at a high level at a same time, a short circuit from NP to DC− will be formed in the bridge arm, resulting in a short circuit. According to an exemplary embodiment of the present disclosure, when the PWMT2' signal, the PWMT3' signal and the PWMT4' signal are all at the high level at a same time, the NAND gate 5000-2 will output a low level signal, so that the enable signal PWMT4 Enable outputted by the second AND gate circuit 6000-2 is 0, thereby forcibly turning off the fourth IGBT device and avoiding a short circuit.

According to an exemplary embodiment of the present disclosure, due to the first fixed delay circuit 1000-1, the enable signal PWMT1 Enable will be always later than the PWMT2' by a fixed time period (e.g., 500 ns), so as to ensure that the PWMT1" signal is always later than PWMT2" by the fixed time period. Therefore, the first IGBT device will not be turned on when the second IGBT device is turned off, and the first IGBT device and the second IGBT device will not be turned on simultaneously.

According to an exemplary embodiment of the present disclosure, due to the first fixed delay circuit 1000-2, the enable signal PWMT4 Enable will be always later than the PWMT3' by a fixed time period (e.g., 500 ns), so as to ensure that the PWMT4" signal is always later than PWMT3" by the fixed time period. Therefore, the fourth IGBT device will not be turned on when the third IGBT device is turned off, and the third IGBT device and the fourth IGBT device will not be turned on simultaneously.

According to an exemplary embodiment of the present disclosure, the signal outputted by the second fixed delay circuit 2000-1 and the PWMT2' flow through the first OR gate circuit 4000-1 to form a PWMT2" signal. Thus, when any one of the signal outputted by the second fixed delay circuit 2000-1 and the PWMT2' signal is at a high level, the PWMT2" signal is also at a high level. Therefore, when the PWMT2' signal is at a high level, regardless of the signal outputted by the second fixed delay circuit 2000-1, the PWMT2" signal is always at a high level, which ensures the validity of the PWMT2' signal. When the signal outputted by the second fixed delay circuit 2000-1 is at a high level, regardless of the PWMT2' signal, the PWMT2" signal is always at a high level. Therefore, the second IGBT device will not be turned off when the PWMT1' signal is at a high level, and the turn-off of the second IGBT device must be later than the turn-off of the first IGBT device by a fixed time period, so that the second IGBT device will not be turned off when the first IGBT device is turned on, and the first IGBT device and the second IGBT device will not be turned off simultaneously, that is, the second IGBT device is turned off at a fixed time period after the first IGBT device is turned off.

According to an exemplary embodiment of the present disclosure, the signal outputted by the second fixed delay circuit 2000-2 and the PWMT3' flow through the first OR gate circuit 4000-2 to form a PWMT3" signal. Thus, when any one of the signal outputted by the second fixed delay circuit 2000-2 and the PWMT3' signal is at a high level, the PWMT3" signal is also at a high level. Therefore, when the PWMT3' signal is at a high level, regardless of the signal outputted by the second fixed delay circuit 2000-2, the PWMT3" signal is always at a high level, which ensures the validity of the PWMT3' signal. When the signal outputted by the second fixed delay circuit 2000-2 is at a high level, regardless of the PWMT3' signal, the PWMT3" signal is always at a high level. Therefore, the third IGBT device will not be turned off when the PWMT4' signal is at a high level, and the turn-off of the third IGBT device must be later than the turn-off of the fourth IGBT device by a fixed time period, so that the third IGBT device will not be turned off when the fourth IGBT device is turned on, and the fourth IGBT device and the third IGBT device will not be turned off simultaneously, that is, the third IGBT device is turned off at a fixed time period after the fourth IGBT device is turned off.

The control circuit for the NPC-type three-level converter according to the exemplary embodiment of the present disclosure has higher reliability, and can perform more perfect on-off logic and timing control on the IGBT devices in the bridge arm to protect the loop of the converter, improving the control performance.

Figure 6:
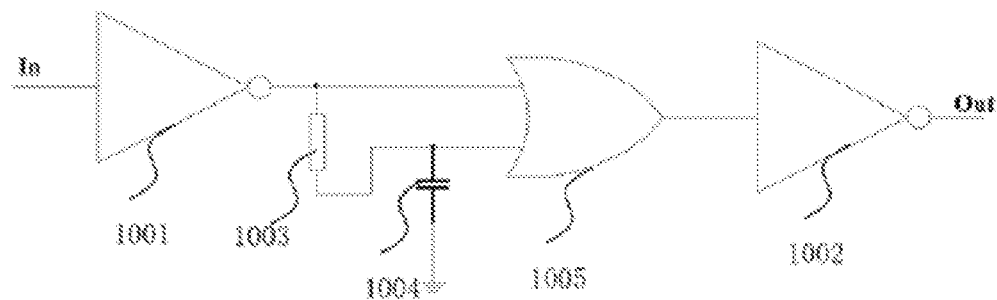
FIG. 6 shows a schematic diagram of a rising edge delay circuit according to an exemplary embodiment of the present disclosure.

FIG. 6 shows a schematic diagram of a rising edge delay circuit according to an exemplary embodiment of the present disclosure.

As shown in FIG. 6, each of the first rising edge delay circuit 101, the second rising edge delay circuit 102, the third rising edge delay circuit 103 and the fourth rising edge delay circuit 104 may include: a first Schmitt trigger 1001, a second Schmitt trigger 1002, a first resistor 1003, a first capacitor 1004, and a second OR gate circuit 1005.

In each rising edge delay circuit, an input terminal of the first Schmitt trigger 1001 serves as the input terminal of the rising edge delay circuit, and an output terminal of the first Schmitt trigger 1001 is connected to a first input terminal of the second OR gate circuit 1005 and a first terminal of the first resistor 1003. A second terminal of the first resistor 1003 is grounded via the first capacitor 1004 and is connected to a second input terminal of the second OR gate circuit 1005. An output terminal of the second OR gate circuit 1005 is connected to an input terminal of the second Schmitt trigger 1002. An output terminal of the second Schmitt trigger 1002 serves as the output terminal of the rising edge delay circuit.

That is, the signal inputted to the rising edge delay circuit is firstly shaped and inverted (that is, the high and low levels are inverted to each other) by the first Schmitt trigger 1001 (e.g., an inverter CD40106), and then is outputted to the two input terminals of the second OR gate circuit 1005. A charging-discharging resistor (i.e., the first resistor 1003) is connected in parallel between the two input terminals of the second OR gate circuit 1005. One of the input terminals of the second OR gate circuit 1005 is grounded via the first capacitor 1004 (e.g., a high-frequency ceramic capacitor). The signal outputted by the second OR gate circuit 1005 is shaped and inverted by the second Schmitt trigger 1002 (e.g., the inverter CD40106), and then outputted.

According to an exemplary embodiment of the present disclosure, when the signal inputted to the rising edge delay circuit is at a low level, the signal is inverted to be at a high level by the first Schmitt trigger 1001. At this time, the second OR gate circuit 1005 has a high level output immediately, which is then inverted to a low level output by the second Schmitt trigger 1002. When the signal inputted to the rising edge delay circuit is jumping from a low level to a high level, the signal is inverted through the first Schmitt trigger 1001 to be jumping from the high level to the low level. At this time, the signal received by one of the input terminals of the second OR gate circuit 1005 is inverted to be at a low level, and the other input terminal of the second OR gate circuit 1005 is discharged through the first capacitor 1004. Therefore, the other input terminal is still at a high level and is maintained for a delay time. The delay time Td is: $Td = -\tau \ln(0.3) = 1.2RC$. Therefore, at this time, the signal outputted by the second OR gate circuit 1005 is still at a high level and maintained for the delay time Td, so that the signal finally outputted by the rising edge delay circuit is still at a low level and is maintained at the low level for the delay time Td, and then is inverted to be at a high level.

Figure 7:
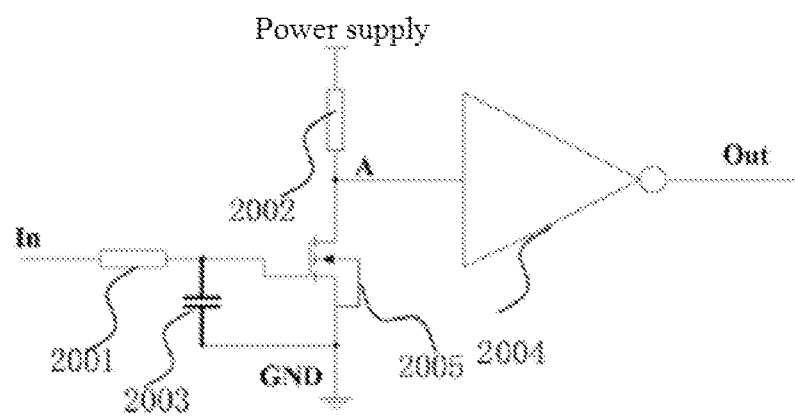
FIG. 7 shows a schematic diagram of a fixed delay circuit according to an exemplary embodiment of the present disclosure.

FIG. 7 shows a schematic diagram of a fixed delay circuit according to an exemplary embodiment of the present disclosure.

As shown in FIG. 7, each fixed delay circuit of the first fixed delay circuit 1000 and the second fixed delay circuit 2000 may include: a second resistor 2001, a third resistor 2002, a second capacitor 2003, a third Schmitt trigger 2004 and a MOSFET transistor 2005.

In each fixed delay circuit, a first terminal of the second resistor 2001 serves as the input terminal of the fixed delay circuit, and a second terminal of the second resistor 2001 is grounded via the second capacitor 2003 and is connected to a gate terminal of the MOSFET transistor 2005. A source terminal of the MOSFET transistor 2005 is grounded. A drain terminal of the MOSFET transistor 2005 is connected to a power supply (e.g., +15V power supply) via the third resistor 2002. The drain terminal of the MOSFET transistor 2005 is also connected to the input terminal of the third Schmitt trigger 2004. An output terminal of the third Schmitt trigger 2004 serves as the output terminal of the fixed delay circuit.

The input signal of the fixed delay circuit is inputted to the MOSFET transistor 2005 (e.g., N-channel MOSFET transistor) through a RC delay circuit, and the output signal of the MOSFET transistor 2005 is shaped and inverted through the third Schmitt trigger 2004 (e.g., an inverter CD40106) and then outputted.

When the input signal of the fixed delay circuit is at a low level, the MOSFET transistor 2005 is turned off, the potential at point A is clamped at a high level, and the output of the third Schmitt trigger 2004 is at a low level. When the input signal jumps from a low level to a high level, the input signal first flows through the second resistor 2001 and charges the second capacitor 2003. Due to the RC charging process, when the input signal jumps from a low level to a high level, there is a delay time Td1 for RC charging. The length of Td1 may be adjusted by adjusting the parameters of RC. When the voltage across the second capacitor 2003 is established and reaches the turn-on threshold Vth of the MOSFET transistor 2005, the MOSFET transistor 2005 is turned on, and the potential at point A is forcibly clamped to the ground, and the output signal of the fixed delay circuit is at a high level at this time. When the input signal jumps from a high level to a low level, the second capacitor 2003 is discharged through the second resistor 2001. Due to the RC discharging process, when the input signal jumps from a high level to a low level, there is a delay time Td2 for RC discharging. The length of Td2 may be adjusted by adjusting the parameters of RC. When the voltage across the second capacitor 2003 is discharged to be lower than the turn-on threshold of the MOSFET transistor 2005, the MOSFET transistor 2005 is turned off, the potential at point A is forcibly clamped to the power supply voltage +15V, and the output signal of the fixed delay circuit is at a low level at this time.

It should be understood that the delay times Td, Td1 and Td2 can meet the delay requirements by adjusting the parameters of RC.

According to another exemplary embodiment of the present disclosure, an NPC-type three-level converter is also provided. The NPC-type three-level converter includes M phase bridge arms and M control circuits as described in the above exemplary embodiments. The M phase bridge arms are in one-to-one correspondence with the M control circuits. For each phase bridge arm, the control circuit corresponding to the phase bridge arm is used to control on and off of IGBT devices in the phase bridge arm. M is a quantity of AC phases.

As an example, the NPC-type three-level converter is a wind power converter.

According to yet another exemplary embodiment of the present disclosure, a wind turbine is also provided. The wind turbine includes the NPC-type three-level converter as described in the above exemplary embodiments.

The above wind turbine and the NPC-type three-level converter have technical effects corresponding to the control circuit for the NPC-type three-level converter, which will not be repeated here.

Although some exemplary embodiments of the present disclosure have been shown and described, it should be understood by those skilled in the art that modifications may be made to these embodiments without departing from the principle and spirit of the present disclosure defined by the appended claims and their equivalents.

The invention claimed is:

1. A control circuit for a phase bridge arm of a Neutral Point Clamp type (NPC-type) three-level converter, the phase bridge arm of the NPC-type three-level converter comprising a plurality of Insulated Gate Bipolar Transistor (IGBT) devices, the control circuit comprising:

an off-time control circuit configured to reserve a preset time period for turn-off of the plurality of IGBT devices in the phase bridge arm, wherein a set of input terminals of the off-time control circuit is configured to receive a set of Pulse Width Modulation (PWM) signals for controlling the plurality of IGBT devices; and a timing control circuit comprising a first sub-circuit and a second sub-circuit, wherein the first sub-circuit comprises a first fixed delay circuit, a second fixed delay circuit, a first AND gate circuit, and a first OR gate circuit, wherein the second sub-circuit comprises a third fixed delay circuit, a fourth fixed delay circuit, a second AND gate circuit, and a second OR gate circuit, wherein in the first sub-circuit, a first input terminal of the first AND gate circuit is connected to a first output terminal of the off-time control circuit, a second input terminal of the first AND gate circuit is connected to a second output terminal of the off-time control circuit via the first fixed delay circuit, an output terminal of the first AND gate circuit is connected to a first input terminal of the first OR gate circuit via the second fixed delay circuit, and a second input terminal of the first OR gate circuit is connected to the first output terminal of the off-time control circuit, wherein in the second sub-circuit, a first input terminal of the second AND gate circuit is connected to a third output terminal of the off-time control circuit via the third fixed delay circuit, a second input terminal of the second AND gate circuit is connected to a fourth output terminal of the off-time control circuit, an output terminal of the second AND gate circuit is connected to a first input terminal of the second OR gate circuit via the fourth fixed delay circuit and a second input terminal of the second OR gate circuit is connected to the third output terminal of the off-time control circuit, wherein output terminals of the timing control circuit are respectively connected to gate terminals of the plurality of IGBT devices, and wherein the output terminal of the first AND gate circuit in the first sub-circuit, an output terminal of the first OR gate circuit in the first sub-circuit, the output terminal of the second AND gate circuit in the second sub-circuit, and an output terminal of the second OR gate circuit in the second sub-circuit serve as the output terminals of the timing control circuit, respectively.

2. The control circuit according to claim 1, wherein:

the first sub-circuit further comprises a first NAND gate circuit and a third AND gate circuit;

in the first sub-circuit, three input terminals of the first NAND gate circuit are respectively connected to the first output terminal, the second output terminal, and the third output terminal of the off-time control circuit, an input terminal of the first fixed delay circuit is connected to the second output terminal of the off-time control circuit, an output terminal of the first NAND gate circuit and an output terminal of the first fixed delay circuit are respectively connected to two input terminals of the third AND gate circuit, and an output terminal of the third AND gate circuit is connected to the second input terminal of the first AND gate circuit;

the second sub-circuit further comprises a second NAND gate circuit and a fourth AND gate circuit; and in the second sub-circuit, three input terminals of the second NAND gate circuit are respectively connected to the second output terminal, the third output terminal, and the fourth output terminal of the off-time control circuit, an input terminal of the third fixed delay circuit is connected to the third output terminal of the off-time control circuit, an output terminal of the second NAND gate circuit and an output terminal of the third fixed delay circuit are respectively connected to two input terminals of the fourth AND gate circuit, and an output terminal of the fourth AND gate circuit is connected to the first input terminal of the second AND gate circuit.

3. The control circuit according to claim 2, wherein:

the off-time control circuit comprises a first rising edge delay circuit, a second rising edge delay circuit, a third rising edge delay circuit, and a fourth rising edge delay circuit;

an output terminal of the first rising edge delay circuit, an output terminal of the second rising edge delay circuit, an output terminal of the third rising edge delay circuit, and an output terminal of the fourth rising edge delay circuit serve as the first output terminal, the second output terminal, the third output terminal, and the fourth output terminal of the off-time control circuit, respectively;

the output terminal of the first rising edge delay circuit is further connected to the first input terminal of the first AND gate circuit in the first sub-circuit;

the output terminal of the second rising edge delay circuit is further connected to the input terminal of the first fixed delay circuit in the first sub-circuit and a second input terminal of the first OR gate circuit in the first sub-circuit;

the output terminal of the fourth rising edge delay circuit is further connected to the second input terminal of the second AND gate circuit in the second sub-circuit; and the output terminal of the third rising edge delay circuit is further connected to the input terminal of the third fixed delay circuit in the second sub-circuit and the second input terminal of the second OR gate circuit in the second sub-circuit.

4. The control circuit according to claim 3, wherein:

each of the first, second, third, and fourth rising edge delay circuits comprises a first Schmitt trigger, a second Schmitt trigger, a first resistor, a first capacitor, and a third OR gate circuit; and in each of the first, second, third, and fourth rising edge delay circuits:

an input terminal of the first Schmitt trigger serves as an input terminal of the corresponding rising edge delay circuit, and an output terminal of the first Schmitt trigger is respectively connected to a first input terminal of the third OR gate circuit and a first terminal of the first resistor;

a second terminal of the first resistor is grounded via the first capacitor and is connected to a second input terminal of the third OR gate circuit, and an output terminal of the third OR gate circuit is connected to an input terminal of the second Schmitt trigger; and an output terminal of the second Schmitt trigger serves as an output terminal of the corresponding rising edge delay circuit.

5. The control circuit according to claim 1, wherein:

each of the first, second, third, and fourth fixed delay circuits comprises a second resistor, a third resistor, a second capacitor, a third Schmitt trigger, and a MOSFET transistor; and in each of the first, second, third, and fourth fixed delay circuits:

a first terminal of the second resistor serves as an input terminal of the corresponding fixed delay circuit, and a second terminal of the second resistor is grounded via the second capacitor and is connected to a gate terminal of the MOSFET transistor;

a source terminal of the MOSFET transistor is grounded, a drain terminal of the MOSFET transistor is connected to a power supply via the third resistor, and the drain terminal of the MOSFET transistor is further connected to an input terminal of e third Schmitt trigger; and an output terminal of the third Schmitt trigger serves as an output terminal of the corresponding fixed delay circuit.

6. The control circuit according to claim 3, wherein:

the phase bridge arm comprises a bridge arm, and the bridge arm comprises a first IGBT device, a second IGBT device, a third IGBT device, and a fourth IGBT device;

a Direct Current (DC) positive pole of the bridge arm is connected to a DC negative pole of the bridge arm sequentially via the first IGBT device, the second IGBT device, the third IGBT device, and the fourth IGBT device comprised in the bridge arm; and the output terminal of the first AND gate circuit in the first sub-circuit is connected to a gate terminal of the first IGBT device in the bridge arm, and the output terminal of the first OR gate circuit in the first sub-circuit is connected to a gate terminal of the second IGBT device in the bridge arm, the output terminal of the second OR gate circuit in the second sub-circuit is connected to a gate terminal of the third IGBT device in the bridge arm, and the output terminal of the second AND gate circuit in the second sub-circuit is connected to a gate terminal of the fourth IGBT device in the bridge arm.

7. The control circuit according to claim 6, wherein the off-time control circuit further comprises a first inverter and a second inverter;

an input terminal of the first rising edge delay circuit and an input terminal of the first inverter are configured to receive a first PWM signal for controlling the first IGBT device from a host computer, an input terminal of the second rising edge delay circuit and an input terminal of the second inverter are configured to receive a second PWM signal for controlling the second IGBT device from the host computer; and
an output terminal of the first inverter is connected to the input terminal of the third rising edge delay circuit, and an output terminal of the second inverter is connected to the input terminal of the fourth rising edge delay circuit.

8. The control circuit according to claim 6, wherein
a delay time of the first rising edge delay circuit is set based on a dead time of the third IGBT device;
a delay time of the second rising edge delay circuit is set based on a dead time of the fourth IGBT device;
a delay time of the third rising edge delay circuit is set based on a dead time of the first IGBT device; and
a delay time of fourth rising edge delay circuit is set based on a dead time of the second IGBT device.

9. The control circuit according to claim 6, wherein:
a first PWM signal received at an input terminal of the first rising edge delay circuit is configured to control the first IGBT device;
a second PWM signal received at an input terminal of the second rising edge delay circuit is configured to control the second IGBT device;
a third PWM signal received at an input terminal of the third rising edge delay circuit is configured to control the third IGBT device; and
a fourth PWM signal received at an input terminal of the fourth rising edge delay circuit is configured to control the fourth IGBT device.

10. A Neutral Point Clamp type (NPC-type) three-level converter, comprising:
M phase bridge arms; and
M control circuits in one-to-one correspondence with the M phase bridge arms,
wherein each of the M control circuits is configured to control turn-on and turn-off of a plurality of Insulated Gate Bipolar Transistor (IGBT) devices in a corresponding one of the M phase bridge arms, and comprises:
an off-time control circuit configured to reserve a preset time period for turn-off of the plurality of IGBT devices in the corresponding one of the M phase bridge arms, wherein a set of input terminals of the off-time control circuit is configured to receive a set of Pulse Width Modulation (PWM) signals for controlling the plurality of IGBT devices; and
a timing control circuit comprising a first sub-circuit and a second sub-circuit,
wherein the first sub-circuit comprises a first fixed delay circuit, a second fixed delay circuit, a first AND gate circuit, and a first OR gate circuit,
wherein the second sub-circuit comprises a third fixed delay circuit, a fourth fixed delay circuit, a second AND gate circuit and a second OR gate circuit,
wherein in the first sub-circuit, a first input terminal of the first AND gate circuit is connected to a first output terminal of the off-time control circuit, a second input terminal of the first AND gate circuit is connected to a second output terminal of the off-time control circuit via the first fixed delay circuit, an output terminal of the first AND gate circuit is connected to a first input terminal of the first OR gate circuit via the second fixed delay circuit, and a second input terminal of the first OR gate circuit is connected to the first output terminal of the off-time control circuit,
wherein in the second sub-circuit, a first input terminal of the second AND gate circuit is connected to a third output terminal of the off-time control circuit via the third fixed delay circuit, a second input terminal of the second AND gate circuit is connected to a fourth output terminal of the off-time control circuit, an output terminal of the second AND gate circuit is connected to a first input terminal of the second OR gate circuit via the fourth fixed delay circuit, and a second input terminal of the second OR gate circuit is connected to the third output terminal of the off-time control circuit,
wherein output terminals of the timing control circuit are respectively connected to gate terminals of the plurality of IGBT devices, and
wherein the output terminal of the first AND gate circuit in the first sub-circuit, an output terminal of the first OR gate circuit in the first sub-circuit, the output terminal of the second AND gate circuit in the second sub-circuit, and an output terminal of the second OR gate circuit in the second sub-circuit serve as the output terminals of the timing control circuit, respectively, and
wherein M is a quantity of Alternative Current (AC) phases.

11. The NPC-type three-level converter according to claim 10, wherein the NPC-type three-level converter is a wind power converter.

12. The NPC-type three-level converter according to claim 10, wherein:
the first sub-circuit further comprises a first NAND gate circuit and a third AND gate circuit;
in the first sub-circuit, —three input terminals of the first NAND gate circuit are respectively connected to the first output terminal, the second output terminal, and the third output terminal of the off-time control circuit, an input terminal of the first fixed delay circuit is connected to the second output terminal of the off-time control circuit, an output terminal of the first NAND gate circuit and an output terminal of the first fixed delay circuit are respectively connected to two input terminals of the third AND gate circuit, and an output terminal of the third AND gate circuit is connected to the second input terminal of the first AND gate circuit.

13. The NPC-type three-level converter according to claim 12, wherein:
the second sub-circuit further comprises a second NAND gate circuit and a fourth AND gate circuit; and
in the second sub-circuit, three input terminals of the second NAND gate circuit are respectively connected to the second output terminal, the third output terminal, and the fourth output terminal of the off-time control circuit, an input terminal of the third fixed delay circuit is connected to the third output terminal of the off-time control circuit, an output terminal of the second NAND gate circuit and an output terminal of the third fixed delay circuit are respectively connected to two input terminals of the fourth AND gate circuit, and an output terminal of the fourth AND gate circuit is connected to the first input terminal of the second AND gate circuit.

14. The NPC-type three-level converter according to claim 13, wherein:
the off-time control circuit comprises a first rising edge delay circuit, a second rising edge delay circuit, a third rising edge delay circuit, and a fourth rising edge delay circuit;
an output terminal of the first rising edge delay circuit, an output terminal of the second rising edge delay circuit, an output terminal of the third rising edge delay circuit, and an output terminal of the fourth rising edge delay circuit serve as the first output terminal, the second output terminal, the third output terminal, and the fourth output terminal of the off-time control circuit, respectively;
the output terminal of the first rising edge delay circuit is further connected to the first input terminal of the first AND gate circuit in the first sub-circuit;
the output terminal of the second rising edge delay circuit is further connected to the input terminal of the first fixed delay circuit in the first sub-circuit and a second input terminal of the first OR gate circuit in the first sub-circuit;
the output terminal of the fourth rising edge delay circuit is further connected to the second input terminal of the second AND gate circuit in the second sub-circuit; and
the output terminal of the third rising edge delay circuit is further connected to the input terminal of the third fixed delay circuit in the second sub-circuit and the second input terminal of the second OR gate circuit in the second sub-circuit.

15. The NPC-type three-level converter according to claim 14, wherein:
each of the first, second, third, and fourth rising edge delay circuits comprises a first Schmitt trigger, a second Schmitt trigger, a first resistor, a first capacitor, and a third OR gate circuit; and
in each of the first, second, third, and fourth rising edge delay circuits:
an input terminal of the first Schmitt trigger serves as an input terminal of the corresponding rising edge delay circuit, and an output terminal of the first Schmitt trigger is respectively connected to a first input terminal of the third OR gate circuit and a first terminal of the first resistor;
a second terminal of the first resistor is grounded via the first capacitor and is connected to a second input terminal of the third OR gate circuit, and an output terminal of the third OR gate circuit is connected to an input terminal of the second Schmitt trigger; and
an output terminal of the second Schmitt trigger serves as an output terminal of the corresponding rising edge delay circuit.

16. The NPC-type three-level converter according to claim 10, wherein:
each of the first, second, third, and fourth fixed delay circuits comprises a second resistor, a third resistor, a second capacitor, a third Schmitt trigger, and a MOSFET transistor; and
in each of the first, second, third, and fourth fixed delay circuits:
a first terminal of the second resistor serves as an input terminal of the corresponding fixed delay circuit, and a second terminal of the second resistor is grounded via the second capacitor and is connected to a gate terminal of the MOSFET transistor;
a source terminal of the MOSFET transistor is grounded, a drain terminal of the MOSFET transistor is connected to a power supply via the third resistor, and the drain terminal of the MOSFET transistor is further connected to an input terminal of the third Schmitt trigger; and
an output terminal of the third Schmitt trigger serves as an output terminal of the corresponding fixed delay circuit.

17. The NPC-type three-level converter according to claim 14, wherein:
the corresponding one of the M phase bridge arms comprises a bridge arm, and the bridge arm comprises a first IGBT device, a second IGBT device, a third IGBT device, and a fourth IGBT device;
a Direct Current (DC) positive pole of the bridge arm is connected to a DC negative pole of the bridge arm sequentially via the first IGBT device, the second IGBT device, the third IGBT device, and the fourth IGBT device comprised in the bridge arm; and
the output terminal of the first AND gate circuit in the first sub-circuit is connected to a gate terminal of the first IGBT device in the bridge arm, and the output terminal of the first OR gate circuit in the first sub-circuit is connected to a gate terminal of the second IGBT device in the bridge arm, the output terminal of the second OR gate circuit in the second sub-circuit is connected to a gate terminal of the third IGBT device in the bridge arm, and the output terminal of the second AND gate circuit in the second sub-circuit is connected to a terminal of the fourth IGBT device in the bridge arm.

18. The NPC-type three-level converter according to claim 17, wherein:
a first PWM signal received at an input terminal of the first rising edge delay circuit is configured to control the first IGBT device;
a second PWM signal received at an input terminal of the second rising edge delay circuit is configured to control the second IGBT device;
a third PWM signal received at an input terminal of the third rising edge delay circuit is configured to control the third IGBT device; and
a fourth PWM signal received at an input terminal of the fourth rising edge delay circuit configured to control the fourth IGBT device.

19. The NPC-type three-level converter according to claim 17, wherein:
a delay time of the first rising edge delay circuit is set based on a dead time of the third IGBT device;
a delay time of the second rising edge delay circuit is set based on a dead time of the fourth IGBT device;
a delay time of the third rising edge delay circuit is set based on a dead time of the first IGBT device; and
a delay time of the fourth rising edge delay circuit is set based on a dead time of the second IGBT device.

20. A wind turbine, comprising:
a Neutral Point Clamp type (NPC-type) three-level converter, comprising:
M phase bridge arms; and
M control circuits in one-to-one correspondence with the M phase bridge arms,
wherein each of the M control circuits is configured to control turn-on and turn-off of a plurality of Insulated Gate Bipolar Transistor (IGBT) devices in a corresponding one of the M phase bridge arms, and comprises:

an off-time control circuit configured to reserve a preset time period for turn-off of the plurality of IGBT devices in the corresponding one of the M phase bridge arms, wherein a set of input terminals of the off-time control circuit is configured to receive a set of Pulse Width Modulation (PWM) signals for controlling the plurality of IGBT devices; and a timing control circuit comprising a first sub-circuit and a second sub-circuit, wherein the first sub-circuit comprises a first fixed delay circuit, a second fixed delay circuit, a first AND gate circuit, and a first OR gate circuit, wherein the second sub-circuit comprises a third fixed delay circuit, a fourth fixed delay circuit, a second AND gate circuit, and a second OR gate circuit, wherein in the first sub-circuit, a first input terminal of the first AND gate circuit is connected to a first output terminal of the off-time control circuit, a second input terminal of the first AND gate circuit is connected to a second output terminal of the off-time control circuit via the first fixed delay circuit, an output terminal of the first AND gate circuit is connected to a first input terminal of the first OR gate circuit via the second fixed delay circuit, and a second input terminal of the first OR gate circuit is connected to the first output terminal of the off-time control circuit, wherein in the second sub-circuit, a first input terminal of the second AND gate circuit is connected to a third output terminal of the off-time control circuit via the third fixed delay circuit, a second input terminal of the second AND gate circuit is connected to a fourth output terminal of the off-time control circuit, an output terminal of the second AND gate circuit is connected to a first input terminal of the second OR gate circuit via the fourth fixed delay circuit, and a second input terminal of the second OR gate circuit is connected to the third output terminal of the off-time control circuit, wherein output terminals of the timing control circuit are respectively connected to gate terminals of the plurality of IGBT devices, and wherein the output terminal of the first AND gate circuit in the first sub-circuit, an output terminal of the first OR gate circuit in the first sub-circuit, the output terminal of the second AND gate circuit in the second sub-circuit, and an output terminal of the second OR gate circuit in the second sub-circuit serve as the output terminals of the timing control circuit, respectively, and wherein M is a quantity of Alternative Current (AC) phases.

* * * * *